United States Patent
Unterreiner et al.

(10) Patent No.: US 9,921,134 B2
(45) Date of Patent: Mar. 20, 2018

(54) SYSTEM AND METHOD FOR DETERMINING TIRE WEAR

(71) Applicants: Dr. Ing. h.c. F. Porsche Aktiengesellschaft, Stuttgart (DE); NIRA Dynamics AB, Linköping (SE)

(72) Inventors: Michael Unterreiner, Stuttgart (DE); Thomas Svantesson, Linköping (SE); Anders Svensson, Ljungsbro (SE); Peter Lindskog, Linköping (SE)

(73) Assignees: Dr. Ing. h.c. F. Porsche Aktiengesellschaft, Stuttgart (DE); NIRA Dynamics AB, Linköping (SE)

( * ) Notice: Subject to any disclaimer, the term of this patent is extended or adjusted under 35 U.S.C. 154(b) by 312 days.

(21) Appl. No.: 14/816,474

(22) Filed: Aug. 3, 2015

(65) Prior Publication Data

US 2016/0033367 A1    Feb. 4, 2016

(30) Foreign Application Priority Data

Aug. 4, 2014 (EM) .................................. 14 179 726

(51) Int. Cl.
*G01M 17/02* (2006.01)
*G01L 17/00* (2006.01)

(52) U.S. Cl.
CPC ......... *G01M 17/022* (2013.01); *G01L 17/005* (2013.01)

(58) Field of Classification Search
None
See application file for complete search history.

(56) References Cited

U.S. PATENT DOCUMENTS 6,405,109 B1    6/2002    Kyrtsos et al.
6,934,659 B2    8/2005    Polzin
(Continued)

FOREIGN PATENT DOCUMENTS

DE    10360723    7/2005
EP    1403100    3/2004
(Continued)

OTHER PUBLICATIONS

Korean Office Action for Korean Application No. 10-2015-0109422, dated Aug. 29, 2016, including English translation, 17 pages.
European Search Report for European Application No. EP 14179726.6—1760 dated Jan. 20, 2015.
Notification of Reasons for Rejection for Japanese Application No. 2015-153212, dated Jun. 28, 2016 with translation, 8 pages.

*Primary Examiner* — Paul West
*Assistant Examiner* — Mark A Shabman
(74) *Attorney, Agent, or Firm* — RatnerPrestia (57) ABSTRACT

System for determining tire wear for tires of a wheeled motor vehicle including a direct tire pressure determination unit being configured to measure at least the tire pressure of the tires; an indirect tire pressure determination unit being configured to determine for at least some of the tires a roll radius factor corresponding to or depending from the roll radius of the respective tire; a tire force determination unit being configured to determine a vertical force factor corresponding to or depending from a vertical force applied to the tires; and a processing unit for determining the tire wear for such tires of the motor vehicle for which the indirect tire pressure determination unit provides the respective roll radius factor, namely by compensating the roll radius factor of the tires provided by the indirect tire pressure determination unit.

16 Claims, 3 Drawing Sheets

(56) References Cited

U.S. PATENT DOCUMENTS

| | | | |
|---|---|---|---|
| 7,577,532 B2 | 8/2009 | Ichikawa et al. | |
| 7,640,081 B2 * | 12/2009 | Lu | B60G 17/016 701/1 |
| 2003/0030553 A1 * | 2/2003 | Schofield | B60C 23/0416 340/442 |
| 2005/0066719 A1 * | 3/2005 | Turner | B60C 11/246 73/146 |
| 2005/0179528 A1 | 8/2005 | Kawasaki | |
| 2006/0156790 A1 * | 7/2006 | Bocquillon | B60C 11/24 73/8 |
| 2006/0267750 A1 * | 11/2006 | Lu | B60C 23/061 340/440 |
| 2008/0024286 A1 | 1/2008 | Perras | |
| 2008/0027658 A1 | 1/2008 | Ichikawa et al. | |
| 2008/0086248 A1 * | 4/2008 | Lu | B60T 8/171 701/41 |
| 2008/0086251 A1 * | 4/2008 | Lu | B60T 8/1755 701/70 |
| 2010/0060443 A1 | 3/2010 | Wakao | |
| 2010/0186492 A1 | 7/2010 | Morinaga | |
| 2015/0057877 A1 * | 2/2015 | Singh | B60C 11/246 701/34.4 |

FOREIGN PATENT DOCUMENTS

| | | |
|---|---|---|
| EP | 1558456 B1 | 8/2005 |
| EP | 2368724 A1 | 9/2011 |
| JP | 10115578 | 5/1998 |
| JP | 2002156312 A | 5/2002 |
| JP | 2005170223 A | 6/2005 |
| JP | 2007153034 | 6/2007 |
| WO | 0187647 A1 | 11/2001 |
| WO | 2014053322 | 4/2014 |

* cited by examiner

SYSTEM AND METHOD FOR DETERMINING TIRE WEAR

CROSS-REFERENCE TO RELATED APPLICATIONS

This application claims priority to European Patent Application No. 14 179 726.6, filed Aug. 4, 2014, which is incorporated by reference herein in its entirety.

FIELD OF THE INVENTION

The present invention relates to a system and to a method for determining tire wear for tires of a wheeled motor vehicle.

BACKGROUND OF THE INVENTION

US 2010/0060443 A1, which is incorporated by reference herein, discloses a prior art system for determining tire wear for tires of a wheeled motor vehicle. The system uses signals provided by a wheel velocity sensor, by a pressure sensor and by a GPS receiver to calculate tire wear.

US 2010/0186492 A1, which is incorporated by reference herein, discloses another prior art system for determining tire wear for tires of a wheeled motor vehicle. The system uses signals provided by a wheel speed sensor and by an acceleration sensor to calculate tire wear.

SUMMARY OF THE INVENTION

Against this background, the present invention provides a new system and new method for determining tire wear for tires of a wheeled motor vehicle allowing a simple, reliable and robust determination of the tire wear.

The system according to the present invention comprises a direct tire pressure determination unit being configured to measure at least the tire pressure of the tires of the motor vehicle. The system according to present invention further comprises an indirect tire pressure determination unit being configured to determine for at least some of the tires of the motor vehicle a roll radius factor corresponding to or depending from the roll radius of the respective tire. The system further comprises a tire force determination unit being configured to determine a vertical force factor corresponding to or depending from a vertical force applied to the tires of the motor vehicle.

The system according to the present invention further comprises a processing unit determining the tire wear for such tires of the motor vehicle for which the indirect tire pressure determination unit provides the respective roll radius factor. The processing unit compensates the roll radius factor of the tires provided by the indirect tire pressure determination unit on basis of the tire pressures of the respective tires provided by direct tire pressure determination unit and of basis of the vertical force factor of the respective tires provided by the tire force determination unit thereby providing a compensated roll radius factor for the respective tire. The processing unit compares the compensated roll radius factor for the respective tire with a reference roll radius factor in such a way that the difference between the compensated roll radius factor and the reference roll radius factor of the respective tire provides the tire wear of the respective tire.

The present invention provides a new system for determining tire wear for tires of a motor vehicle allowing a simple, reliable and robust determination of the tire wear.

According to an improved embodiment, the direct tire pressure determination unit is further configured to measure the tire temperatures of the tires, wherein the processing unit compensates the roll radius factor of the tires provided by the indirect tire pressure determination unit also on basis of the tire temperatures of the respective tires provided by the direct tire pressure determination unit. This allows a more reliable and more robust determination of the tire wear.

According to a first alternative of the present invention, the indirect tire pressure determination unit is configured to determine a relative roll radius factor for a subset of tires of the motor vehicle on basis of a relative roll radius analysis, wherein the processing unit determines a relative tire wear only for said subset of tires. The processing unit determines on basis of input data received by an input device the reference roll radius factor. The tire wear determination using the relative roll radius analysis requires input data to be provided by the input device. Further, if all the tires wear down with approximately the same rate, this tire wear will be undetected by nature of the first alternative using the relative roll radius analysis.

These drawbacks can be avoided by a second alternative of the present invention in which the indirect tire pressure determination unit is configured to determine an absolute roll radius factor for all tires of the motor vehicle on basis of an absolute roll radius analysis, wherein the processing unit determining an absolute tire wear for all tires of the motor vehicle. The processing unit determines during a regular driving mode of the motor vehicle the reference roll radius factor on basis of data measured and/or calculated during the regular driving mode.

BRIEF DESCRIPTION OF THE DRAWINGS

Embodiments of the system for determining tire wear for tires of a motor vehicle are given in the description below. Exemplary embodiments will be explained in more detail with reference to the drawing, in which.

DETAILED DESCRIPTION OF THE INVENTION

The present patent application relates to a system for determining tire wear for tires of a wheeled motor vehicle.

Figure 1:
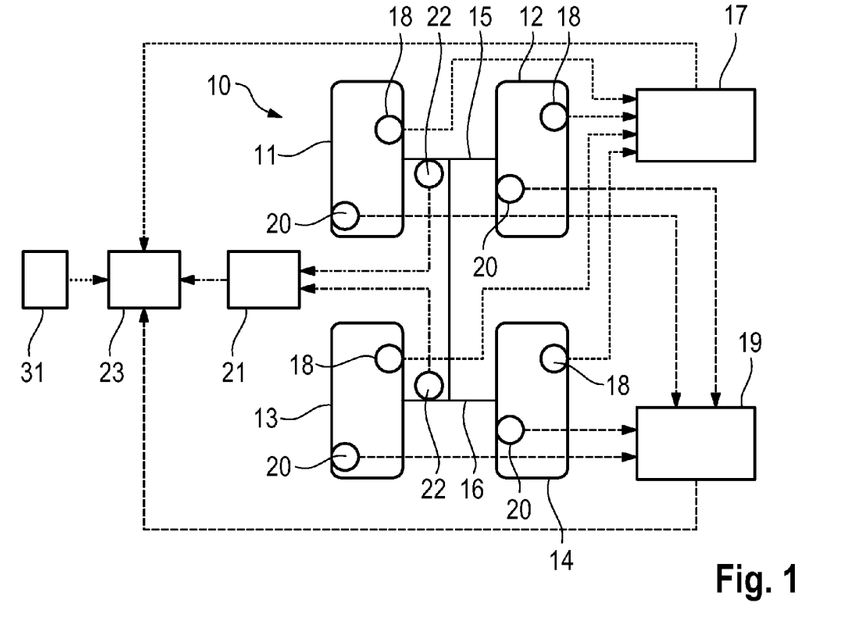
FIG. 1 shows a schematic block diagram of a system for determining tire wear for tires of a motor vehicle.

FIG. 1 shows a schematic, exemplary block diagram of a wheeled motor vehicle 10 having front tires 11, 12 and rear tires 13, 14. Is should be noted that the invention is not limited to such a motor vehicle. The invention can also be used in connection with other motor vehicles like a motor cycle having only one front tire and one rear tire.

The front tires 11 and 12, namely a left front tire 11 and right front tire 12, are assigned to a front axle 15 of the motor vehicle. The rear tires 13 and 14, namely a left rear tire 13 and right rear tire 14, are assigned to a rear axle 16 of the motor vehicle 10.

The system for determining the tire wear of the tires 11, 12, 13, 14 of a motor vehicle 10 comprises a direct tire pressure determination unit 17 being configured to measure at least the tire pressure of the tires 11, 12, 13 and 14 of the motor vehicle 10. In the shown embodiment, the direct tire pressure determination unit 17 comprises sensors 18 assigned to the tires 11, 12, 13 and 14 of the motor vehicle 10, wherein the sensors 18 of the direct tire pressure determination unit 17 are configured to measure at least the tire pressure of the tires 11, 12, 13 and 14 of the motor vehicle 10.

Preferably, the direct tire pressure determination unit 17, namely sensors of the same, is further configured to measure the tire temperatures of the tires of the motor vehicle 10.

The system for determining the tire wear of the tires 11, 12, 13, 14 of a motor vehicle 10 further comprises an indirect tire pressure determination unit 19 being configured to determine for at least some of the tires 11, 12, 13, 14 of the motor vehicle 10 a roll radius factor corresponding to or depending from the roll radius of the respective tire 11, 12, 13, 14.

In the shown embodiment, the indirect tire pressure determination unit 19 comprises sensors 20 assigned to the tires 11, 12, 13 and 14 of the motor vehicle 10, wherein the sensors 20 of the indirect tire pressure determination unit 19 are configured to measure variables of the motor vehicle, e.g. the wheel speed of the tires 11, 12, 13 and 14, on which the roll radius factors are to be determined. Details of the determination of the roll radius factors will be described below in greater detail.

The system for determining the tire wear of the tires 11, 12, 13, 14 of a motor vehicle 10 further comprises a tire force determination unit 21 being configured to determine a vertical force factor corresponding to or depending from a vertical force applied to the tires 11, 12, 13, 14 of the motor vehicle 10. The tire force determination unit 21 comprises sensors 22 being configured to measure the height of the tires 11, 12, 13, 14 or the height of the axles 15, 16 to which are tires 11, 12, 13, 14 are assigned thereby providing the vertical force factor corresponding to or depending from a vertical force applied to the tires 11, 12, 13, 14 of the motor vehicle 10.

According to a first embodiment, said sensors 22 are designed as axle height sensors. For motor vehicles 10 equipped with Xenon light control systems, i.e. headlights that have an adjustable beam alignment, the pitch angle of the motor vehicle 10 has to be determined. An estimate of the angle is achieved by means of a sensor measuring the distance between the rear axle 16 and the chassis. For many motor vehicles this is extended with an additional sensor, measuring the distance between the front axle 15 and the chassis as well. According to a second embodiment, said sensors 22 are designed as individual tire height sensors.

Such sensors measuring the height between a tire 11, 12, 13, 14 and the chassis are available in vehicles with e.g. air suspension systems. In contradiction to the axle height sensors, these sensors are individual for each tire 11, 12, 13 and 14, which make them more capable to detect sidewise load changes in the car.

The system for determining the tire wear of the tires 11, 12, 13, 14 of a motor vehicle 10 further comprises a processing unit 23 determining the tire wear for such tires of the motor vehicle for which the indirect tire pressure determination unit 19 provides the respective roll radius factor.

The processing unit 23 compensates the roll radius factor of the tires 11, 12, 13, 14 provided by the indirect tire pressure determination unit 19 at least on basis of the tire pressures of the respective tires 11, 12, 13, 14 provided by direct tire pressure determination unit 17 and on basis of the vertical force factor of the respective tires 11, 12, 13, 14 provided by the tire force determination unit 21 thereby providing a compensated roll radius factor for the respective tire. In case that the direct tire pressure determination unit 17 is further configured to measure the tire temperatures of the tires of the motor vehicle 10, the processing unit 23 compensates the roll radius factor of the tires 11, 12, 13, 14 further on basis of the tire temperatures. The above compensation of the roll radius factor of the tires 11, 12, 13, 14 provided by the indirect tire pressure determination unit 19 results in compensated roll radius factors for the respective tires 11, 12, 13, 14. The processing unit 23 then compares the compensated roll radius factor for the respective tire 11, 12, 13, 14 with a reference roll radius factor in such a way that the difference between the compensated roll radius factor and the reference roll radius factor of the respective tire provides the tire wear of the respective tire 11, 12, 13, 14.

The invention is based on the understanding that the effective roll radius of each tire is mainly a function of the tire pressure in the respective tire 11, 12, 13, 14, of the applied vertical force on the respective tire 11, 12, 13, 14, and of the actual tire wear of the respective tire 11, 12, 13, 14. In order to determine the tire wear, the system according to the present invention compensates at least for the tire pressure in the respective tire 11, 12, 13, 14 and for the vertical force on the respective tire 11, 12, 13, 14.

Figure 2:
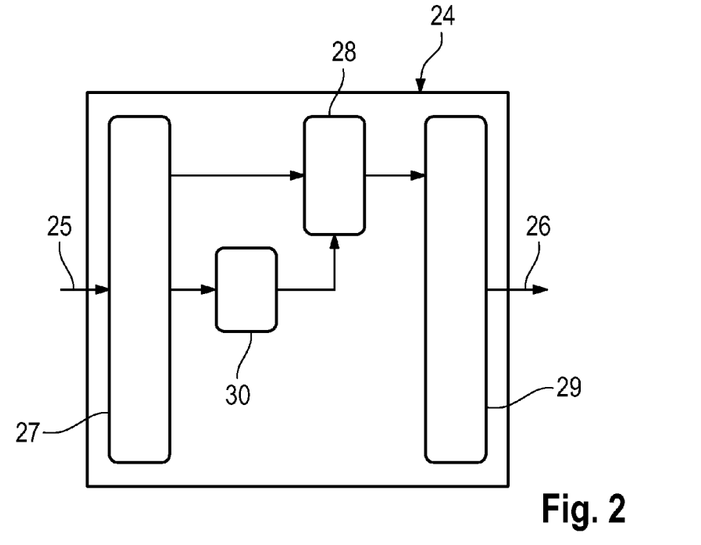
FIG. 2 shows another block diagram for the system of FIG. 1.
Figure 3:
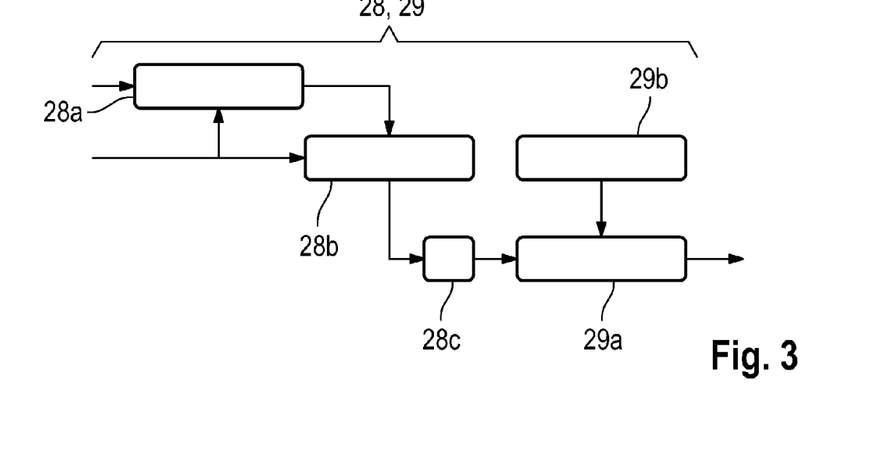
FIG. 3 shows another block diagram for the system of FIGS. 1 and 2.

FIGS. 2 and 3 illustrate further details of the system for determining the tire wear of the tires 11, 12, 13, 14 of a motor vehicle 10 in form of other block diagrams.

The block 24 in FIG. 2 illustrates the tire wear determining system receiving input data 25 at least from the sensors 18, 20, 22 of the direct tire pressure determination unit 17, of the indirect tire pressure determination unit 19 and of the tire force determination unit 21. The system 24 generates output data 26, namely at least output data being indicative of the tire wear to be determined.

The block 27 in FIG. 2 illustrates a signal pre-processing (SPP) unit, wherein the signal pre-processing (SPP) unit 27 performs signal conditioning and calculation of common variables. The block 28 in FIG. 2 illustrates the calculation of the roll radius factors by the indirect tire pressure determination unit 19 and the compensation of said roll radius factors by the processing unit 23. The block 29 in FIG. 2 illustrates the determination of the tire wear of the tires 11, 12, 13, 14 on basis of the compensated roll radius factors.

FIG. 2 further illustrates a driving state detector unit 30. The driving state detector unit 30 is configured to detect the driving state of the motor vehicle 10. The processing unit 23 determines the tire wear of tires 11, 12, 13, 14 only at predefined driving state of the motor vehicle 10, preferably if the lateral acceleration of the motor vehicle 10 is relatively low and if brakes of the motor vehicle 10 are inactive and if a transmission system of the motor vehicle 10 is inactive, and if an ESP-unit of the motor vehicle 10 is inactive.

FIG. 3 illustrates the blocks 28, 29 of FIG. 2 in greater details. In FIG. 3, block 28 of FIG. 2 is represented by three sub-blocks 28a, 28b and 28c, wherein block 29 of FIG. 2 is represented by two sub-blocks 29a and 29b. The sub-block 28a illustrates signal quality checks. The sub-block 28b illustrates the calculation of the roll radius factors by the indirect tire pressure determination unit 19. Sub-block 28c illustrates the compensation of said roll radius factors by the processing unit 23. The sub-block 29a illustrates the determination of the tire wear of the tires 11, 12, 13, 14 on basis of the compensated roll radius factors provided by sub-block 28c and on basis of reference roll radius factors provided by block 29b. It is also possible to compensate the roll radius factors for changes in the speed of the motor vehicle 10 resulting in changing circumferential forces on the tires 11, 12, 13, 14.

According to a first alternative, the indirect tire pressure determination unit 19 is configured to determine a relative roll radius factor for a subset of tires 11, 12, 13, 14 of the motor vehicle 10 on basis of a relative roll radius analysis, wherein the processing unit 23 determines a relative tire wear only for said subset of tires 11, 12, 13, 14. Details will be described below.

Figure 4:
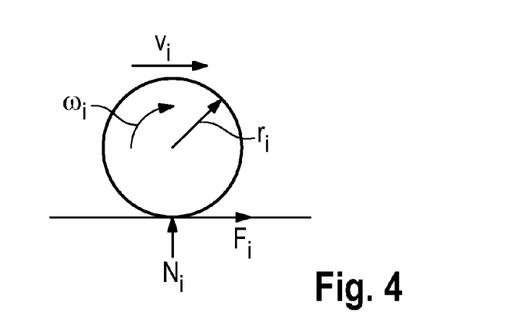
FIG. 4 shows on tire of the motor vehicle.

The relative and absolute roll radius analysis is based on the principle that for a fixed tire pressure and a fixed vertical load, the roll radius of the tire 11, 12, 13, 14 becomes smaller in proportion to the tire wear and therefore the wheel speed increases. The tire wear estimation considers the geometry shown in FIG. 4. At the driven wheel or tire i (i=11, 12, 13, 14) of the motor vehicle 10 the circumferential velocities $\omega_i r_i$ in the contact patches typically differ from the absolute velocity $v_i$ between wheel hub and pavement. This difference is called longitudinal wheel slip $s_i$ and is defined as:

$$s_i = \frac{\omega_i r_i}{v_i} - 1$$

The normalized traction force $\mu_i$ is furthermore defined as the ratio between the wheel reaction force $F_i$, and the normal force $N_i$ $$\mu_i = \frac{F_i}{N_i}$$

where $\mu_{i,max} = \max|F_i/N_i|$ corresponds to the maximum friction value in the longitudinal direction for each individual wheel.

The force $F_i$ can be calculated through the available torque $T_i$ at the given wheel after the gearbox or transmission system of the motor vehicle 10

$$F_i = \frac{T_i}{r_i}$$

Let T denote the total available torque after the gearbox. Then by assuming that the torque distribution between the front (F) axle 15 and rear (R) axle 16 is $$T_F = \gamma T$$

$$T_R = (1-\gamma)T$$

with $\gamma \in [0,1]$ being a known torque transfer parameter, the normalized traction forces for each wheel or tire on the axle can be computed as $$\mu_F = \frac{T_F}{2 r_F N_F}$$

$$\mu_R = \frac{T_R}{2 r_R N_R}$$

where $r_F$, $r_R$, $N_F$ and $N_R$ are the wheel radii and the normal forces at the front (F) and rear (R) axles 15, 16, respectively.

The idea behind the relative tire wear determination is to use the measured and normalized traction forces and the longitudinal wheel slips to identify the current relative tire wear of the tires 11, 12, 13, 14. This method works in traction mode for: front-wheel drive vehicles, with the rear wheels serving as velocity references; rear-wheel drive vehicles, with the front wheels serving as velocity references; vehicles with a hang-on all wheel drive in which the drive torque is distributed fully variably to the front axle or to the rear axle, depending on the driving situation.

E.g., for a front-wheel drive vehicle 10 the front tires 11, 12 are affected by slip, which is calculated directly from the wheel speeds $\omega_i$ (i=11, 12, 13, 14) as $$s_{11} = \frac{\omega_{11}}{\omega_{13}} - 1,$$

$$s_{12} = \frac{\omega_{12}}{\omega_{14}} - 1$$

The normalized traction forces $\mu_i$ of the front wheels 11, 12 are calculated based on the engine torque. The engine torque of the motor vehicle 10 is available on a bus system of the motor vehicle 10.

The above calculations are preferably performed in block 27 of FIG. 2.

Figure 5:
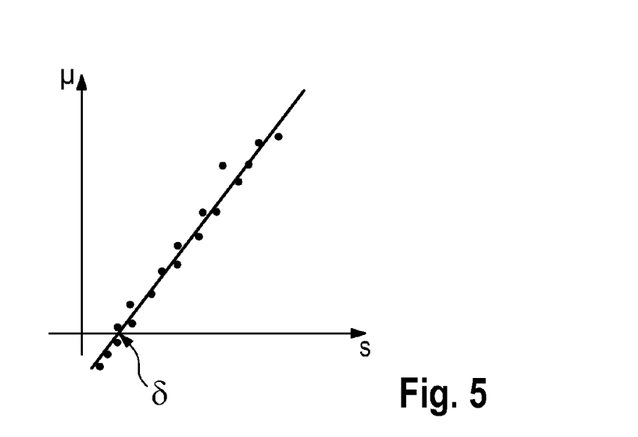
FIG. 5 shows a diagram illustrating a first alternative of the invention using a relative roll wheel radius analysis.

Signal processing techniques are then used to calculate offsets $\delta_i$ and slopes $1/k_i$ of a linear regression fit (see FIG. 5) $\mu_i$ versus slip data $s_i$ $$s_{11} = \frac{1}{k_{11}} \mu_{11} + \delta_L$$

and $$s_{12} = \frac{1}{k_{12}} \mu_{12} + \delta_R$$

A linear regression of the slip $s_i$ versus the normalized traction forces $\mu_i$ provides the relative roll radius factor. In particular, the offset $\delta_L$, $\delta_R$ serves as relative roll radius factor.

The above linear regression is preferably performed in block 28, 28a of FIG. 2, 3.

A relative roll radius analysis can be implemented to detect a relative tire wear of one tire to three tires and here it is assumed that the tire wear will be pronounced on the driven axle during normal customer relevant driving, and on the front axle during race-track applications.

Furthermore, for rear wheel drive vehicles, the same equations apply with the front wheels serving as velocity references.

E.g., for an all-wheel drive vehicle in which the drive torque is distributed fully variably to the front axle 15 or the rear axle 16, the above equations apply. In a non-limited example, for a motor vehicle 10 with most of the driving torque applied on the rear axle 16 the slips are calculated as $$s_{left} = \frac{\omega_{13}}{\omega_{11}} - 1,$$

-continued $$s_{right} = \frac{\omega_{14}}{\omega_{12}} - 1$$

and the linear regression now to be solved can for example be $$s_{left} = [\mu_{13} - \mu_{11} \quad 1] \cdot \begin{bmatrix} 1/k_{13} \\ \delta_L \end{bmatrix}$$

$$s_{right} = [\mu_{14} - \mu_{12} \quad 1] \cdot \begin{bmatrix} 1/k_{14} \\ \delta_R \end{bmatrix}$$

It is here stressed that the indirect tire pressure determination unit 19 cannot provide an absolute roll radius factor. They are relative by nature.

As explained above, the relative roll radius factor is a function of the vertical load and a function of the tire pressure and therefore becomes compensated on basis of these variables using the data provided by the direct tire pressure determination unit 17 and by the tire force determination unit 21. This compensation is performed in block 28, 28b of FIG. 2, 3. The compensation provides the compensated roll radius factor for the respective tires 11, 12, 13, 14.

As also explained above, the processing unit 23 compares the compensated roll radius factor for the respective tire 11, 12, 13, 14 with a reference roll radius factor in such a way that the difference between the compensated roll radius factor and the reference roll radius factor of the respective tire provides the tire wear of the respective tire 11, 12, 13, 14.

When the relative roll radius analysis is used, the processing unit 23 determines the reference roll radius factor on basis of input data received by an input device 31 (see FIG. 1). The input device 31 is configured to receive input data provided by a user interacting with the input device 31 through a user interface, wherein the processing unit 23 determines the relative tire wear on basis of the input data received by the input device 31. Preferably, the driver inputs said data once new tires 11, 12, 13, 14 are mounted. After a tire change, the driver uses the user interface to type in the actual tread depth measured at the time when mounting the tires. This information then gives the reference for the tire wear.

The relative roll radius analysis further uses learning data. This data gets learnt during normal driving after an active reset by the driver. The learning data consists of roll radius factor ratios between the tire positions and these values are stored for various driving speed intervals. The calibration data for relative roll radius analysis is collected in a number of speed slots. The calculations are batch based in the linear regression, and each speed slot can include multiple batches.

A situation of tire wear may be detected if the roll radius factor of a specific tire has changed due to tire wear. The roll radius factor becomes compensated for the external influences, namely at least vertical load change and pressure change. As mentioned above, the relative roll radius analysis works for a radius change on one to three tires. This is however not considered to be a severe limitation since the tire wear is expected to be most severe on tires mounted on the rear axle 16 or front axle 15. The obvious benefit of the invention is that for monitoring the state of the tire wear no additional sensor is necessary.

Figure 6:
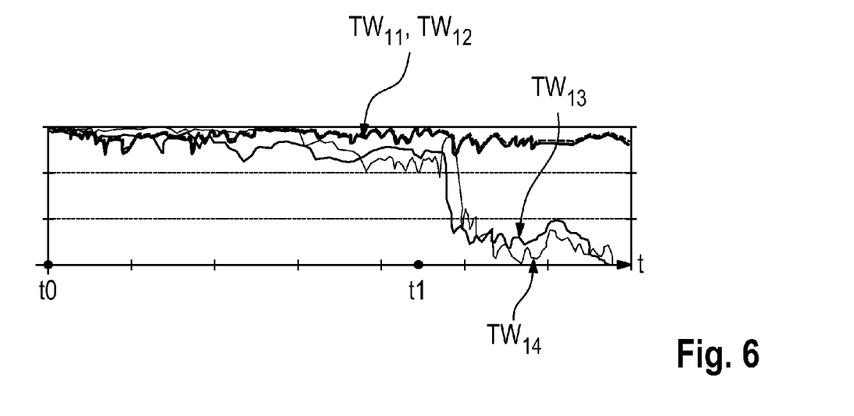
FIG. 6 shows another diagram illustrating the first alternative of the invention using the relative roll wheel radius analysis.

An example result using the relative roll radius analysis is given in FIG. 6. The motor vehicle 10 is here driven with new tires 11, 12, 13, 14 on all wheels starting at time t0. At time t1 worn down tires become mounted on the rear axle 16. As can be seen, the system clearly indicates tire wear $TW_{13}$, $TW_{14}$ for tires 13, 14 on the rear axle 16.

When the determined tire wear is greater than a predefines threshold, the system can generate a warning signal for the driver. When the determined tire wear is smaller than the predefined threshold, the system will not generate such a warning signal.

A major drawback with the relative roll radius analysis is that it requires the tread depth to be measured in order to input that by the input unit 31 as a starting point reference.

Another drawback of the relative roll radius analysis is that if all the tires 11, 12, 13, 14 wear down with approximately the same rate, this tire wear will be undetected since the estimates are relative by nature.

A remedy to this situation is to use an absolute roll radius analysis using various input signals, such as a radar speed providing an estimate of the vehicles absolute velocity from an adaptive cruise control, GPS Doppler speed, GPS speed using differentiated pseudo-ranges or similar to estimate the absolute speed at each individual tire 11, 12, 13 and 14 with good precision. To this end, this estimate of the absolute speed of the vehicle is then used to calculate the individual wheel slips. For the normalized traction forces, the equations describes in connection with the relative roll radius analysis still apply, but the linear regression is now extended to be $$s_i = [\mu_i \quad -\omega_i/v_i] \cdot \begin{bmatrix} 1/k_i \\ \Delta r_i \end{bmatrix}$$

where $\Delta r_i$ are the estimated errors in the assumed individual wheel radii $r_i$ and $\omega_i$ are the measured angular velocities. With this new linear regression, the same approach as presented above applies, but the intersection is now $\Delta r_i$. $\Delta r_i$ serves as absolute roll radius factor.

Hence, the used wheel radii $r_i$ may be interpolated/extrapolated and calculated as a function of the vehicle speed, individual tire pressures and vertical loads as stated below.

The absolute tire wear estimator needs reference data. This data gets learnt during normal driving, possibly but not necessarily after an active reset by the driver. If an active reset is conducted, this is preferably done after a tire switch.

The learning data consists of the estimated errors in the assumed individual wheel radii $\Delta r_i$ and these values are stored for various driving speed intervals. The calibration data for the wheel individual radii are collected in a number of speed slots. The calculations are batch based in the linear regression, and each speed slot can include multiple batches.

During calibration, for each of the separate speed ranges a separate calibration is calculated. Only in the case when a calibration value for a speed range has been calculated, monitoring of the tire wear is provided in that speed range. To this end, it is necessary that the vehicle actually has been in that speed range, for which tire wear estimation is to be accomplished, such that calibration for that speed range is possible.

Calibration takes several minutes. As a result, for a motor vehicle 10, e.g. previously driven at speeds allowed in urban or rural environments and now being driven at higher speeds, e.g. on a highway, the tire wear information will not be available as long as no calibration for the respective higher speed range has been completed. That is, at least for several minutes the tire wear monitoring in a previously calibrated speed range is not possible or at least not reliable. To cover such periods, in tire pressure monitoring applications it is known to estimate calibration values for such speed ranges.

EP 1 403 100 A1, which is incorporated by reference herein, discloses to extrapolate calibration values for speed ranges for which no calibration has been completed on the basis of calibration values of adjacent speed ranges for which calibration has been completed. DE 103 60 723 A1, which is incorporated by reference herein, discloses to estimate calibration values for speed ranges for which no calibration has been completed on the basis of calibration values of adjacent speed ranges for which calibration been completed, particular by averaging calibration values of adjacent lower speed range and an adjacent higher speed range.

Since the roll radius of a tire 11, 12, 13, 14 can be measured in a test-bench for various speed ranges, pressures and vertical loads, such calibration values can be used as predefined calibration curves for a completely new tire. Thus based on at least one tire calibration data such a calibration curve can be selected which then can be used as starting point for the complete speed range of the motor vehicle 10. This selected calibration curve can with the measured tire pressure from the direct tire pressure determination unit 17 and vertical load from the tire force determination unit then be used to calculate compensated wheel radii $r_i$ for various speed ranges serving as compensated absolute roll radius factor.

Figure 7:
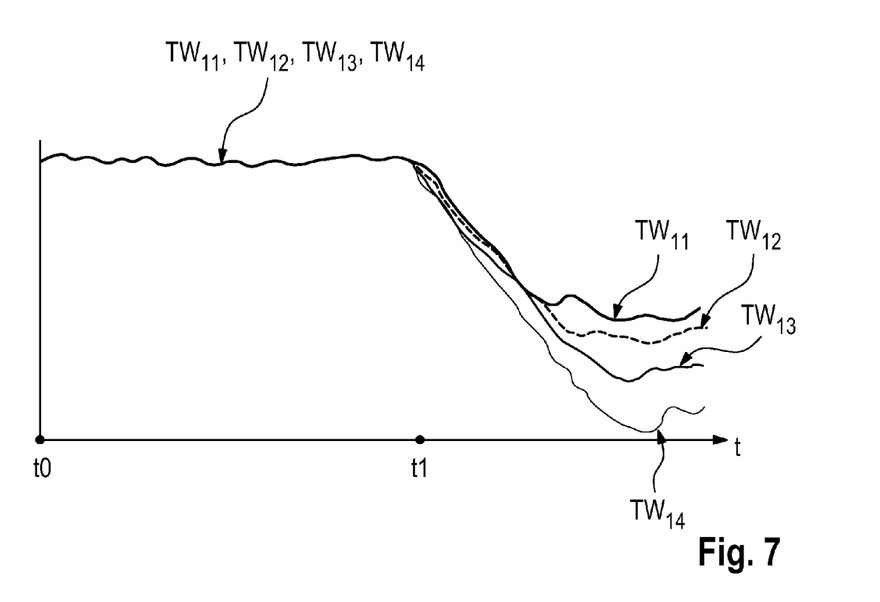
FIG. 7 shows a diagram illustrating a second alternative of the invention using an absolute roll wheel radius analysis.

An example result using the absolute roll radius analysis is given in FIG. 7. The vehicle is here driven with new tires on all wheels from time t0 to time t1. At time t1 worn tires on all wheels became mounted. The absolute tire wear estimator clearly indicates the tire wear TW on all tires 11, 12, 13, 14. This tire wear would be left undetected by the relative tire wear estimator, since the relative speeds would be unchanged. Furthermore, the absolute tire wear estimator will work for all types of front-wheel/real-wheel/all-wheel drive vehicles, including permanent all-wheel drive vehicles with 50:50 torque split between the front axle 15 and rear axle 16.

As mentioned above, the processing unit 23 determines the tire wear of tires 11, 12, 13, 14 only at defined driving states of the motor vehicle 10 detected by the driving state detector unit 30. In some driving states of the motor vehicle 10 the sensor signals may be affected by other factors than just the tire wear, which can lead to an undesired behavior such as false indications.

As a consequence, a quality examination of the input data is performed on a sample-by sample basis, and if the quality is judged to be inadequate, the tire wear determination by the processing unit 23 is temporarily deactivated. Such conditions are for example: braking in progress; gear shift in progress; control system like ABS, ESP engaged. The quality examination is performed by driving state detector unit 30.

The driving state detector unit 30 can also be used to monitor data and will disable the roll radius analysis if deemed necessary. An output signal of the driving state detector unit 30 may not be triggered unless some specific condition has been true for a period of time, e.g. oval track driving state or a roundabout driving state.

Wheel speed signals may be obtained using one or more wheel speed sensors of, for example, ABS systems and/or from the vehicles internal CAN/Flex Ray-bus and/or any suitable vehicle sensor, preferably already part of vehicles.

Sensors for generating sensor signals that can be used with the present invention is a selection of at least one of, for example, a wheel speed sensor, a wheel acceleration sensor, a 3D driving vehicle position sensor, a 3D driving vehicle velocity sensor, a driving vehicle velocity sensor, a wheel acceleration sensor, a wheel/tire pressure sensor, a driving vehicle yaw rate sensor, an engine torque sensor, a wheel axis torque sensor, a suspension (related) sensor, a wheel temperature sensor and an ambient temperature sensor. Suitable sensor types include, e.g., axle height sensors, any other analog distance sensors, geophones which convert displacements into voltage, or e.g. in-tire pressure/accelerometer sensors.

LIST OF REFERENCE SIGNS 10 motor vehicle
11 tire
12 tire
13 tire
14 tire
15 axle
16 axle
17 direct tire pressure determination unit
18 sensor
19 indirect tire pressure determination unit
20 sensor
21 tire force determination unit
22 sensor
23 processing unit
24 system
25 input date
26 output data
27 block
28 block
28a sub-block
28b sub-block
28c sub-block
29 block
29a sub-block
29b sub-block
30 block
31 input unit

What is claimed is:

1. A system for determining tire wear for tires of a wheeled motor vehicle, comprising:
a direct tire pressure determination unit being configured to measure at least the tire pressure of the tires;
an indirect tire pressure determination unit being configured to determine for at least some of the tires a roll radius factor corresponding to or depending from a roll radius of the respective tire and based upon longitudinal wheels slips and a normalized traction force of the respective tire;
a tire force determination unit being configured to determine a vertical force factor corresponding to or depending from a vertical force applied to the tires;
a processing unit determining the tire wear for such tires of the motor vehicle for which the indirect tire pressure determination unit provides the respective roll radius factor, namely
by compensating the roll radius factor of the tires provided by the indirect tire pressure determination unit on basis of the tire pressures of the respective tires provided by direct tire pressure determination unit and on the basis of the vertical force factor of the respective tires provided by the tire force determination unit thereby providing a compensated roll radius factor for the respective tire, and by comparing the compensated roll radius factor for the respective tire with a reference roll radius factor in such a way that the difference between the compensated roll radius factor and the reference roll radius factor of the respective tire provides the tire wear of the respective tire.

2. The system according to claim 1, wherein the direct tire pressure determination unit is further configured to measure tire temperatures of the tires of the motor vehicle, and wherein the processing unit compensates the roll radius factor of the tires provided by the indirect tire pressure determination unit also on the basis of the tire temperatures of the respective tires provided by the direct tire pressure determination unit.

3. The system according to claim 1, wherein the direct tire pressure determination unit comprises sensors assigned to the tires of the motor vehicle, wherein the sensors of the direct tire pressure determination unit are configured to measure at least the tire pressure of the tires of the motor vehicle.

4. The system according to claim 1, wherein the tire force determination unit comprises sensors being configured to measure a height of the tires or a height of axles to which tires are assigned thereby providing the vertical force factor corresponding to or depending from a vertical force applied to the tires of the motor vehicle.

5. The system according to claim 1, wherein the indirect tire pressure determination unit is configured to determine a relative roll radius factor for a subset of tires of the motor vehicle on the basis of a relative roll radius analysis, wherein the processing unit determines a relative tire wear only for said subset of tires of the motor vehicle.

6. The system according to claim 5, further comprising an input device being configured to receive input data provided by a user interacting with the input device through a user interface, wherein the processing unit determines the relative tire wear on the basis of the input data received by the input device.

7. The system according to claim 6, wherein the processing unit determines the reference roll radius factor on the basis of the input data received by the input device.

8. The system according to claim 1, wherein the indirect tire pressure determination unit is configured to determine an absolute roll radius factor for all tires of the motor vehicle on basis of an absolute roll radius analysis, wherein the processing unit determines an absolute tire wear for all tires of the motor vehicle.

9. The system according to claim 8, wherein the processing unit determines during a regular driving mode of the motor vehicle the reference roll radius factor on the basis of data measured and/or calculated during the regular driving mode.

10. The system according to claim 1, wherein the processing unit determines the tire wear of tires only at a predefined driving state of the motor vehicle if a lateral acceleration of the motor vehicle is below a predetermined threshold value and/or if brakes of the vehicle are inactive and/or if a transmission system of the motor vehicle is inactive and/or if an Electronic Stability Program (ESP) unit of the motor vehicle is inactive.

11. A method for determining tire wear for tires of a wheeled motor vehicle, comprising:

measuring at least the tire pressure of the tires using a direct tire pressure determination unit;

determining for at least some of the tires a roll radius factor corresponding to or depending from a roll radius of the respective tire and based upon longitudinal wheels slips and a normalized traction force of the respective tire, using an indirect tire pressure determination unit;

determining a vertical force factor corresponding to or depending from a vertical force applied to the tires using a tire force determination unit; and determining the tire wear for such tires of the motor vehicle for which the indirect tire pressure determination unit provides the respective roll radius factor (i) by compensating the roll radius factor of the tires provided by the indirect tire pressure determination unit on the basis of the tire pressures of the respective tires provided by the direct tire pressure determination unit and on the basis of the vertical force factor of the respective tires provided by the tire force determination unit thereby providing a compensated roll radius factor for the respective tire, and (ii) by comparing the compensated roll radius factor for the respective tire with a reference roll radius factor in such a way that a difference between the compensated roll radius factor and the reference roll radius factor of the respective tire provides the tire wear of the respective tire; and alerting a driver of the wheeled motor vehicle when the determined tire wear exceeds a predefined threshold value.

12. The method according to claim 11, further comprising measuring tire temperatures of the tires of the motor vehicle using the direct tire pressure determination unit, wherein within the step of determining the roll radius factor of the tires provided by the indirect tire pressure determination unit are also compensated on the basis of the tire temperatures of the respective tires provided by the direct tire pressure determination unit.

13. The method according to claim 11, wherein a relative roll radius factor for a subset of tires of the motor vehicle on the basis of a relative roll radius analysis is performed, and wherein a processing unit determines a relative tire wear only for said subset of tires.

14. The method according to claim 11, wherein an absolute roll radius factor for all tires of the motor vehicle on the basis of an absolute roll radius analysis is performed, and wherein a processing unit determines an absolute tire wear for all tires of the motor vehicle.

15. A computer program product for determining tire wear for tires of a wheeled motor vehicle, the computer program product comprising program code for carrying out, when executed on a processing system, the method according to claim 11.

16. A system for determining tire wear for tires of a wheeled motor vehicle, comprising:

a direct tire pressure determination unit being configured to measure at least the tire pressure of the tires, wherein the direct tire pressure determination unit comprises sensors assigned to the tires of the motor vehicle, and wherein the sensors of the direct tire pressure determination unit are configured to measure at least the tire pressure of the tires of the motor vehicle;

an indirect tire pressure determination unit being configured to determine for at least some of the tires a roll radius factor corresponding to or depending from a roll radius of the respective tire and based upon longitudinal wheels slips and a normalized traction force of the respective tire;

a tire force determination unit being configured to determine a vertical force factor corresponding to or depending from a vertical force applied to the tires, wherein the tire force determination unit comprises sensors being configured to measure a height of the tires or a height of axles to which the tires are assigned thereby providing the vertical force factor corresponding to or depending from a vertical force applied to the tires of the motor vehicle;

a processing unit determining the tire wear for such tires of the motor vehicle for which the indirect tire pressure determination unit provides the respective roll radius factor, namely by compensating the roll radius factor of the tires provided by the indirect tire pressure determination unit on basis of the tire pressures of the respective tires provided by direct tire pressure determination unit and on the basis of the vertical force factor of the respective tires provided by the tire force determination unit thereby providing a compensated roll radius factor for the respective tire, and by comparing the compensated roll radius factor for the respective tire with a reference roll radius factor in such a way that the difference between the compensated roll radius factor and the reference roll radius factor of the respective tire provides the tire wear of the respective tire.

* * * * *